United States Patent
Hagstrum et al.

(10) Patent No.: US 9,661,504 B1
(45) Date of Patent: May 23, 2017

(54) USE OF CUSTOMER IMPACT TO PRIORITIZE NETWORK EFFORTS

(71) Applicant: Sprint Communications Company L.P., Overland Park, KS (US)

(72) Inventors: William Troy Hagstrum, Olathe, KS (US); Brandi L. Welch, Oklahoma City, OK (US); Nicole E. Wunder, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 81 days.

(21) Appl. No.: 14/553,999

(22) Filed: Nov. 25, 2014

(51) Int. Cl.
*G06Q 30/02* (2012.01)
*H04W 16/18* (2009.01)
*H04W 4/24* (2009.01)
*H04W 24/04* (2009.01)
*G06Q 10/06* (2012.01)

(52) U.S. Cl.
CPC ........ *H04W 16/18* (2013.01); *G06Q 10/0631* (2013.01); *H04W 4/24* (2013.01); *H04W 24/04* (2013.01)

(58) Field of Classification Search
CPC ...... G06Q 30/02; H04W 8/30; H04L 41/0213
See application file for complete search history.

(56) References Cited

U.S. PATENT DOCUMENTS

| | | |
|---|---|---|
| 5,854,903 A | 12/1998 | Morrison et al. |
| 5,974,308 A | 10/1999 | Vedel |
| 6,112,101 A | 8/2000 | Bhatia et al. |
| 6,999,943 B1 | 2/2006 | Johnson et al. |
| 7,853,244 B1 | 12/2010 | Brisebois |
| 9,118,780 B2 | 8/2015 | Hutchenson et al. |
| 2005/0174995 A1 | 8/2005 | Tovinger |
| 2005/0197114 A1* | 9/2005 | Kent ............... H04W 8/30 455/423 |
| 2006/0030291 A1* | 2/2006 | Dawson ............ G06Q 30/02 455/405 |
| 2007/0167150 A1 | 7/2007 | Hutcheson |
| 2009/0063220 A1 | 3/2009 | Raufaste et al. |
| 2009/0298465 A1 | 12/2009 | Choi et al. |
| 2010/0214957 A1 | 8/2010 | De Carvalho Resende et al. |
| 2010/0229205 A1 | 9/2010 | Hakusui |

(Continued)

OTHER PUBLICATIONS

FAIPP Pre-Interview Communication dated Oct. 3, 2016, U.S. Appl. No. 14/226,804, filed Mar. 24, 2014.

(Continued)

*Primary Examiner* — Vladimir Magloire
*Assistant Examiner* — Majid Syed

(57) ABSTRACT

A method of prioritizing network efforts using customer impact. The method comprises calculating a total revenue of each of the plurality of cell towers by summing up each revenue of a cell tower as a top cell tower for a mobile communication device, ranking the plurality of cell towers based on their total revenues, categorizing the cell towers based on the revenue ranking, and categorizing top cell towers of a retail store of a wireless carrier that maintains the cell towers as category one cell towers, whereby category one cell towers have the highest priority in the categorization system, whereby maintenance, spare parts, expansions, and upgrades are promoted based on the categorization of cell towers.

20 Claims, 10 Drawing Sheets

(56) References Cited

U.S. PATENT DOCUMENTS

2012/0276867 A1 11/2012 McNamee et al.
2015/0039755 A1* 2/2015 Kane .................. H04L 41/0213
                                                              709/224

OTHER PUBLICATIONS

Warner, Kevin D., entitled, "System and Method for Cell Site Performance Management," filed Mar. 24, 2014, U.S. Appl. No. 14/226,804.

* cited by examiner

USE OF CUSTOMER IMPACT TO PRIORITIZE NETWORK EFFORTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices are electronic devices that are used for mobile voice and/or data communications based on wireless network connectivity, which can be provided by base stations known as cell towers or sites. Most traffic from or to a mobile communication device may go through a very limited number of cell towers, for example 80% of traffic through less than ten cell towers.

SUMMARY

In an embodiment, a method of prioritizing network efforts using customer impact is disclosed. The method comprises ranking cell towers that a mobile communication device uses based on usage by the mobile communication device during a past predefined period of time and building a list of top cell towers for each of a plurality of mobile communication devices based on usage ranking, wherein top cell towers of a mobile communication device are cell towers that have higher usage ranking by the mobile communication device, wherein the number of top cell towers for one mobile communication device is a predefined number less than 10. The method further comprises associating a total revenue from each subscriber of each of the plurality of mobile communication devices to each of the mobile communication device's top cell towers, whereby each of a plurality of top cell towers associated with each subscriber of the mobile communication device bears the total revenue of the subscriber of the mobile communication device, calculating a total revenue of each of the plurality of cell towers by summing up each revenue of a cell tower as a top cell tower for a mobile communication device, and ranking the plurality of cell towers based on their total revenues. The method further comprises categorizing the cell towers based on the revenue ranking and re-categorizing top cell towers of a retail store of a wireless carrier that maintains the cell towers to a category one cell tower, whereby category one cell towers have the highest priority in the categorization system, whereby maintenance, spare parts, expansions, and upgrades are promoted based on the categorization of cell towers In and embodiment, a method of prioritizing wireless network efforts using customer impact is disclosed. The method comprises ranking cell towers that a mobile communication device uses based on usage by the mobile communication device during a past predefined period of time and building a list of top cell towers for each of a plurality of mobile communication devices based on usage ranking, wherein top cell towers of a mobile communication device are cell towers that have higher usage ranking by the mobile communication device, wherein the number of top cell towers for one mobile communication device is a predefined number less than 10. The method further comprises associating a total revenue from each subscriber of each of the plurality of mobile communication devices to each of the mobile communication device's top cell towers, whereby each top cell tower bears the total revenue of the subscriber of the mobile communication device, calculating a total revenue of each of the plurality of cell towers by summing up each revenue of a cell tower as a top cell tower for a mobile communication device, and ranking the plurality of cell towers based on their total revenues. The method further comprises categorizing the cell towers based on the revenue ranking, augmenting the capacity of a category one cell tower when average peak traffic of the cell tower approaches a first predefined threshold but before the average peak traffic reaches the first predefined threshold, and augmenting the capacity of a category two cell tower when average peak traffic of the cell tower reaches a second predefined threshold, wherein the second predefined threshold is larger than the first predefined threshold. The method further comprises limiting drop rates of category one cell towers to a third predefined threshold and limiting drop rates of category two cell towers to a fourth predefined threshold, wherein the fourth predefined threshold is larger than the third predefined threshold.

In an embodiment, a method of categorizing cell towers in a mobile communication network is disclosed. The method comprises ranking cell towers that a mobile communication device uses based on usage by the mobile communication device during a past predefined period of time and building a list of top cell towers for each of a plurality of mobile communication devices based on usage ranking, wherein top cell towers of a mobile communication device are cell towers that have higher usage ranking by the mobile communication device, wherein the number of top cell towers for one mobile communication device is a predefined number less than 10. The method further comprises associating a total revenue from each subscriber of each of the plurality of mobile communication devices to each of the mobile communication device's top cell towers, whereby each top cell tower bears the total revenue of the subscriber of the mobile communication device, calculating a total revenue of each of the plurality of cell towers by summing up each revenue of a cell tower as a top cell tower for a mobile communication device, and ranking the plurality of cell towers based on their total revenues. The method further comprises categorizing a first cell tower, with a total revenue ranking in the top 12% of all cell towers, as a category one cell tower, categorizing a second cell tower, with a total revenue ranking between the top 13% and the top 47% of all cell towers, as a category two cell tower, and categorizing a third cell tower, with a total revenue ranking between the top 48% and the top 65% of all cell towers, as a category three cell tower. The method further comprises categorizing a fourth cell tower, with a total revenue ranking in the bottom 35% of all cell towers, as a category four cell tower and moving a cell tower from one of the categories two, three, and four to category one based on a priority factor.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
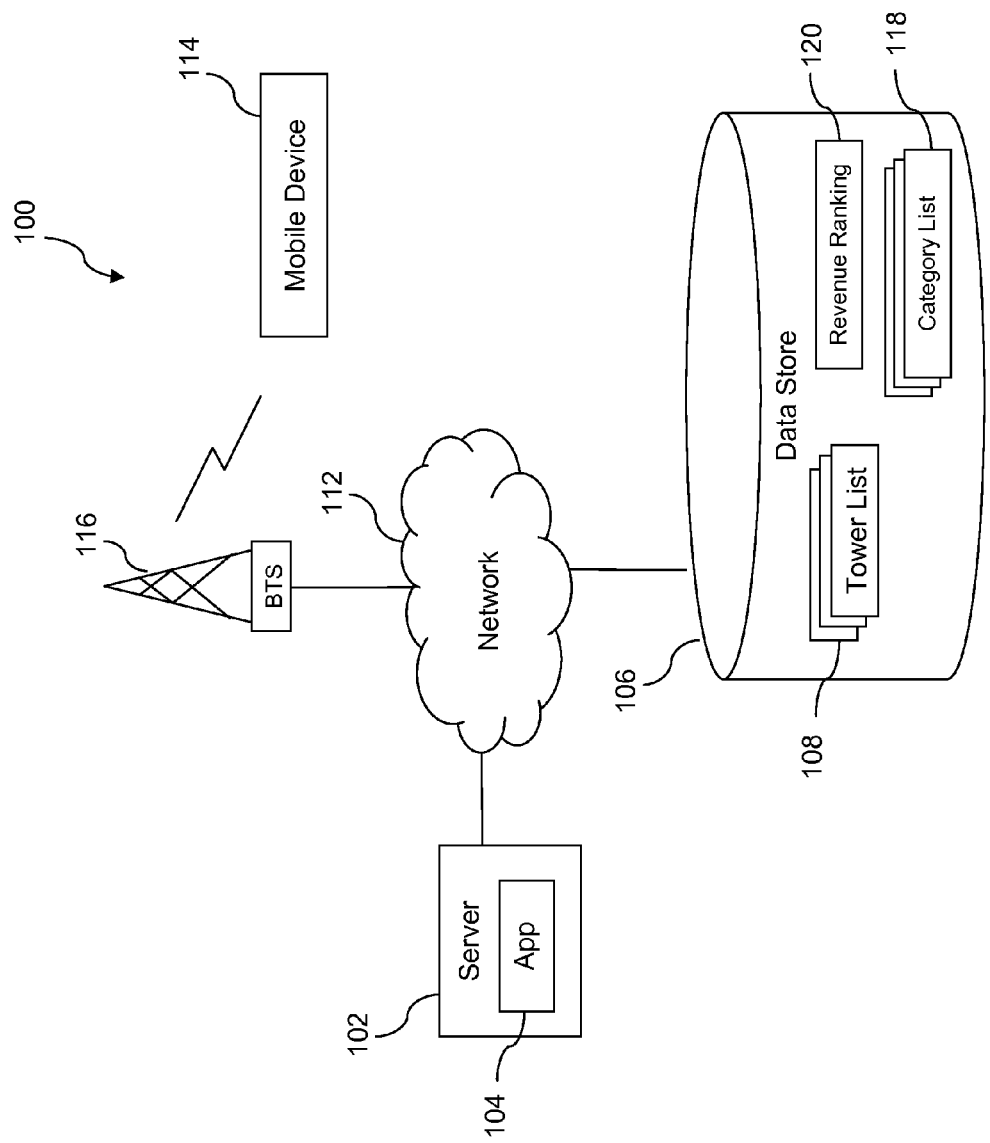
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In most of the current wireless communications systems, base transceiver stations, cell towers, or cell sites may be given the same treatment for maintenance or upgrades. Or, a few cell towers located in relatively densely populated areas may be treated differently than the rest of the cell towers that are maintained by one wireless communications service provider. For example, a few cell towers in populated areas may be given better treatment for maintenance or upgrades than the rest of the cell towers. The present disclosure teaches a different method of prioritizing cell towers. For example, the total revenue of a subscriber may be assigned or associated to each of a plurality of top cell towers of the subscriber. Top cell towers of a mobile communication device are a relatively small number of cell towers (for example 3 towers or 5 towers) that have high usage by the mobile communication device. The reason all the revenue associated with a subscriber is assigned to each of the top towers is that if any of the top towers of the subscriber experiences technical issues, the subscriber may leave the wireless communications service provider. The wireless communications service provider may suffer from loss of the whole revenue from the subscriber instead of just a portion of the total revenue from the subscriber. Said in other words, all of the subscriber revenue is at risk when any single cell tower among the top towers of that subscriber provides poor service. The allocation or association of subscriber revenue to top towers may be referred to as revenue at risk.

Cell towers may be categorized based on total revenues attributed to the cell towers as described above. Insights from categorizing cell towers may also be used to adjust patterns and timings of upgrades and additions of new network capacity (either expanded capacity on individual towers or additional towers). The present disclosure teaches a system and method for using customer revenue or at risk revenue to prioritize network efforts. This may be referred to as using customer impact to prioritize network efforts, for example prioritizing distribution of limited budgets to improve or upgrade cell towers.

For example, voice and data call activities from mobile communication devices through cell towers may be automatically recorded for usage recording. Cell towers that a mobile communication device uses may be ranked by an application based on usage by the mobile communication device during a past predefined period of time. The application may be stored in a server maintained by the wireless communications service provider. The application may access records of voice and/or data call activities of mobile communication devices associated with specific base transceiver stations or cell towers, for example by accessing call detail records (CDRs) from a data store. A list of top cell towers for each mobile communication device may be built by the application based on usage ranking. The list of the top cell towers may be stored in the data store by the application. The number of top cell towers for one mobile communication device may be a predefined number less than 10.

A total revenue from a subscriber of each mobile communication device may be associated to each of the mobile communication device's top cell towers by the application. Said in other words, each top cell tower of a mobile communication device bears the total revenue of the subscriber of the mobile communication device. A total revenue of each of the cell towers may be calculated by the application by summing up each revenue of a cell tower as a top cell tower for a mobile communication device. For example, if a cell tower is a top cell tower for five different mobile communication devices, the cell tower bears a total revenue that is the sum of a total revenue from each of the five different mobile communication devices. A total revenue from a subscriber may be counted more than once—double counting, triple counting, quadruple counting, quintuple counting, etc. Cell towers may be ranked by the application based on their total revenues or the total of revenues at risk of each of the cell towers, for example in order from the most total revenue at risk to the least total revenue at risk. The revenue ranking may be stored by the application in a revenue ranking list in the data store.

The application may then categorize the cell towers based on the revenue ranking. For example, the cell towers with total revenues ranked about in the top 12% of all cell towers may be categorized as category one cell towers. Cell towers with total revenues ranked between about the top 13% to about the top 47% of all cell towers may be categorized as category two cell towers. Cell towers with total revenues ranked between about the top 48% and about the top 65% of all cell towers may be categorized as category three cell towers. The rest of the cell towers may be categorized as category four cell towers. Category one cell towers may be given the highest priority for maintenance or upgrades. Category two cell towers may be given the second highest priority for maintenance or upgrades. Category three cell towers may be given the third highest priority for maintenance or upgrades. Category four cell towers may be given the lowest priority for maintenance or upgrades. Alternatively, all remaining cell towers ranked from the top 48% may be categorized as category three cell towers and there may be no fourth category of cell towers. The number of categories of cell towers may be different in different embodiments of the disclosure. The number of categories of cell towers may be selected based on the number of different levels of network efforts that may be undertaken or the number of different ways of distributing limited financial resources for upgrading cell towers. The categorization may be stored by the application in a category list in the data store.

Cell towers may also be promoted into a category with higher priority from a category with lower priority based on a priority factor. Priority factors may comprise a variety of factors. For example, cell towers serving a first responder location may be re-categorized to category one cell towers. A first responder may be fire personnel, police personnel, emergency medical personnel, or another type of emergency personnel. Cell towers serving a corporate retail store of the wireless communications service provider may be re-categorized to category one cell towers. Custom network solutions (CNS) full scale cell towers may be re-categorized to category one cell towers. Heavily used cell towers through evolution-data optimized (EVDO), long-term evolution (LTE), or another type of wireless communications technology, may be re-categorized to category two from categorize three or categorize four. Other special cases may also be priority factors, for example executive briefing centers. Cell towers may be promoted from a category with lower priority to a category with higher priority, but may not be demoted from a category with higher priority to a category with lower priority in each of a plurality of cell tower categorization cycles.

Category one cell towers, with the highest priority among all cell towers, may be maintained or upgraded with the highest priority. For example, the capacity of a category one cell tower may be augmented when the average peak traffic of the cell tower approaches a first predefined peak traffic threshold but before the average peak traffic reaches the first predefined peak traffic threshold. For example, the application may send a notification on capacity augmentation to relevant personnel when the average peak traffic of a category one cell tower approaches the first predefined peak traffic threshold but before the average peak traffic reaches the first predefined peak traffic threshold. Alternatively, capacity augmentation may be automated in this situation, for example by sending a notification on capacity augmentation to an application or a server computer that manages the cell tower to activate more available capacity of the cell tower. Capacity of a category two cell tower may be augmented when the average peak traffic of the cell tower reaches a second predefined peak traffic threshold. The second predefined peak traffic threshold may be larger than the first predefined peak traffic threshold. Similarly, capacity of a category three cell tower may be augmented when the average peak traffic of the cell tower reaches a fifth predefined peak traffic threshold. The fifth predefined peak traffic threshold may be larger than the second predefined peak traffic threshold.

A drop rate of category one cell towers may be limited by the application to a third predefined drop rate threshold. For example, the application may send a notification on limiting the drop rate to relevant personnel when the drop rate of a category one cell tower approaches the third predefined drop rate threshold but before the drop rate of the category one cell tower surpasses the third predefined drop rate threshold. The drop rate of category two cell towers may be limited to a fourth predefined drop rate threshold. For example, the application may send a notification on limiting the drop rate to relevant personnel when the drop rate of a category two cell tower approaches the fourth predefined drop rate threshold but before the drop rate of the category two cell tower surpasses the fourth predefined drop rate threshold. The fourth predefined drop rate threshold may be larger than the third predefined drop rate threshold. The application may limit the drop rate of category three cell towers to a sixth predefined drop rate threshold. For example, the application may send a notification on limiting the drop rate to relevant personnel when the drop rate of a category three cell tower surpasses the sixth predefined drop rate threshold. The sixth predefined drop rate threshold may be larger than the fourth predefined drop rate threshold.

By categorizing cell towers based on their total revenues, network efforts such as maintenance, spare parts, expansions, and upgrades may be allocated in a more effective way. The categorization of cell towers may also be used for automated network responses and/or other purposes. Using priority factors to move cell towers between categories may improve the categorization system by including special cases.

Turning now to FIG. 1, a communication system 100 is described. In an embodiment, the communication system 100 comprises a server computer 102, a plurality of mobile communication devices 114, and a data store 106. The server 102 may comprise an application 104. The data store 106 may comprise a plurality of top cell tower lists 108, a revenue ranking list 120, and a plurality of category lists 118. The mobile communication device 114 may be configured to use a radio transceiver to establish a wireless communication link with a base transceiver station (BTS) 116, and the base transceiver station 116 may provide communications connectivity of the mobile communication device 114 to a network 112. The server 102 and the data store 106 may also have access to the network 112. The network 112 may comprise any combination of private and public networks.

It is understood that the system 100 may comprise any number of mobile communication devices 114, any number of base transceiver stations 116, any number of servers 102, and any number of data stores 106. The collectivity of base transceiver stations 116 may be said to comprise a radio access network, in that these base transceiver stations 116 may provide a radio communication link to the mobile communication devices 114 to provide access to the network 112.

The radio transceiver of the mobile communication device 114 may communicate with the base transceiver station 116 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The mobile communication device 114 may be any of a mobile phone, a personal digital assistant (PDA), a media player, a laptop computer, a tablet computer, a notebook computer, a wearable computer, a headset computer, or another network/communications capable device. In an embodiment, the mobile communication device 114 may have other components (not shown) such as a near field communication (NFC) radio transceiver, a short range radio transceiver such as a wireless local area network (WLAN) radio transceiver, or other components.

In an embodiment, the application 104 may be stored in a memory of the server 102. When executed by a processor of the server 102, the application 104 may perform a variety of functionality according to using customer impact to prioritize network efforts. For example, the application 104 may access records of voice and/or data call activities of mobile communication devices 114 through base transceiver stations 116 or cell towers, for example accessing call detail records (CDRs) from a data store. The base transceiver stations 116 may be referred to as cell towers 116 hereinafter. The application 104 may build a top cell tower list 108 for each mobile communication device 114 with a predefined number of cell towers that the mobile communication device 114 uses the most. The application 104 may associate a total revenue from each subscriber of each of the mobile communication devices 114 to each of the mobile communication device's top cell tower. The application 104 may calculate a total revenue of each of the cell towers 116 by summing up each revenue of a cell tower as a top cell tower for a mobile communication device 114. A total revenue from a single subscriber may be double counting, triple counting, quadruple counting, quintuple counting, and more counting revenue. However, this may not cause problems since it is the revenue at risk if that cell tower performs poorly. The application 104 may rank the cell towers 116 based on their total revenues and/or may categorize the cell towers based on their revenue rankings. Additionally, the application 104 may arrange maintenance and/or upgrades for the cell towers based on their categorization.

For example, the application 104 may analyze voice and/or data call activities for each mobile communication device 114 associated with cell towers 116 for usage recording and/or counting purposes. For example, the application 104 may access CDRs on voice and/or data call attempts from a particular mobile communication device 114 over a recent window of time, for example over the most recent 7 days, over the most recent 15 days, over the most recent 30 days, or some other time interval. The application 104 may count the number of times the mobile communication device 114 uses cell towers 116 for voice and/or data calls. The application 104 may store this information in the data store 106, for example into an entry in the data store 106 associated with the mobile communication device 114. The cell towers 116 may be ranked in order from the most used cell tower to the least used cell tower, for example voice and/or data traffic volume, total use time period, call attempt times, or another type of usage standard.

Based on the usage of the cell towers 116, the application 104 may build a top cell tower list 108 for the mobile communication device 114. For example, a subtotal of usage associated with the cell towers 116 with the most usage by the mobile communication device 114 may be calculated. A total usage from the mobile communication device 114 associated with cell towers may be calculated. A ratio of the subtotal usage over the total usage by the mobile communication device 114 may also be calculated. The ratio may be compared with a predefined amount. When the ratio is smaller than the predefined amount, the subtotal usage and the ratio may be recalculated. The subtotal usage may be recalculated by adding usage from a cell tower 116 with less usage in the cell tower order to an existing subtotal usage. When the ratio of the subtotal usage over the total usage by the mobile communication device 114 exceeds a predefined amount, the calculation of the subtotal may be stopped or halted, and the cell towers 116 that contribute to the subtotal usage may be selected to be recorded on the top cell tower list 108. Alternatively, a predefined number, for example 5, 8, 10, or some other predefined number, of cell towers associated with the most usage by the mobile communication device 114 may be selected to be recorded on the top cell tower list 108.

In an embodiment, the top cell tower list 108 may be periodically re-determined by the application 104 based on predefined rules, for example every 10 days, every 15 days, every 30 days, or at some other periodic interval. Note that the period of time over which the call activities are recorded may be different from the period of time when the top cell tower list 108 is re-determined. For example, the call activities may be collected over the last month, and the top cell tower list 108 may be re-determined every day.

The application 104 may associate a total revenue from each subscriber of each of the mobile communication devices 114 to each of the mobile communication device's top cell towers. Said in other words, each top cell tower of a mobile communication device 114 may bear the total revenue from the subscriber of the mobile communication device 114. For example, when a total revenue from a subscriber of a mobile communication device 114 is 50 dollars a month and the mobile communication device 114 has five top cell towers, the 50 dollar total revenue from the subscriber may be associated to each of the five top cell towers. The application 104 may calculate a total revenue of each of the cell towers 116 by summing up each revenue of a cell tower 116 as a top cell tower for a mobile communication device 114. For example, a cell tower 116 may be top cell towers used by multiple mobile communication devices 114, and each revenue of the cell tower 116 as a top cell tower for a mobile communication device 114 may be summed up by the application 104 to obtain a total revenue for the cell tower 116.

The application 104 may rank the cell towers 116 based on their total revenues and/or store the revenue ranking in a revenue ranking list 120 in the data store 106. In an embodiment, the cell towers 116 may be ranked in order from the cell tower 116 with the most revenue to the cell tower with the least revenue. The application 104 may then categorize the cell towers into a predefined number of categories based on the revenue ranking and/or store the categorization in a category list 118 in the data store 106. For example, the application 104 may categorize the cell towers 116 based on predefined thresholds for the revenue ranking. For example, a first cell tower, with a total revenue ranking in about the top 12% of all cell towers 116, may be categorized by the application 104 as a category one cell tower. A second cell tower, with a total revenue ranking between about the top 13% and the top 47% of all cell towers 116, may be categorized as a category two cell tower. A third cell tower, with a total revenue ranking between about the top 48% and the top 65% of all cell towers, may be categorized as a category three cell tower. A fourth cell tower, with a total revenue ranking in about the bottom 35% of all cell towers, may be categorized as a category four cell tower. It is noted that although categorizing cell towers into four categories is used throughout as an example and preferred embodiment, the cell towers may be categorized into some other number of categories. The thresholds of categorizing cell towers based on revenue ranking may be other predefined numbers other than 12%, 13%, 47%, 48%, 65%, and/or 35%.

The application 104 may re-categorize a top cell tower to category one based on a priority factor. The application 104 may promote a cell tower from another category to category one based on the priority factor. In an embodiment, a category one tower may have the highest priority in the categorization system, for example compared to a category two tower, a category three tower, or a category four tower. In another embodiment, cell towers in another category other than category one may have the highest priority among all cell towers. For example, a retail store of a wireless carrier that maintains the cell towers 116 may be a priority factor and the application 104 may re-categorize top cell towers of the retail store to a category one cell towers. Custom network solutions (CNS) may be a priority factor and the application 104 may re-categorize a full scale cell tower serving custom network solutions to a category one cell tower. First responders may be a priority factor and a cell tower 116 that supports wireless communications of a first responder may be categorized as a category one cell tower by the application 104.

In an embodiment, a cell tower may be promoted or prioritized but may not be demoted or deprioritized. For example, a cell tower may be promoted from a category with less priority to a category with more priority. However, the cell tower may not be demoted from a category with more priority to a category with less priority. The categorization of cell towers may be used for planning build-outs, automated network responses, and/or other purposes. Maintenance, spare parts, expansions, and/or upgrades may be promoted based on the categorization of the cell towers 116. For example, spare parts for category one cell towers may be stored so that the spare parts may be easily accessed within a short period of time, for example 12 hours, 24 hours, or another short period of time. The categorization of cell towers may be updated periodically, for example every quarter, every six months, every year, or at some other periodic interval.

The application 104 may augment capacity of a category one cell tower when the average peak traffic of the cell tower approaches a first predefined threshold but before the average peak traffic reaches the first predefined threshold. For example, when the maximum traffic threshold for category one cell towers is 80%, the application 104 may augment capacity of the category one cell tower when the average peak traffic through the cell tower reaches 72%. The application 104 may augment capacity of a category two cell tower when average peak traffic of the cell tower reaches a second predefined threshold. For example, when the maximum traffic threshold for category two cell towers is 85% and when the average peak traffic through a category two cell tower reaches 85%, the application 104 may augment capacity of the category two cell tower. The second predefined threshold, the maximum traffic threshold for cell towers in a category with less priority, may be larger than the first predefined threshold, the maximum traffic threshold for cell towers in a category with more priority. For example, the maximum traffic threshold for category two cell towers, 85%, may be larger than the maximum traffic threshold for category one cell towers, 80%.

The average peak traffic may be calculated in a variety of ways. For example, average traffic during peak hours in a peak month of a year may be calculated as the average peak traffic. For example, noon of Mother's day is well known as the busiest hour in a whole year for voice calls. Thus, traffic from 11 am to 1 pm may be collected from May 11 to June 11 and average peak traffic may be calculated based on that. The traffic volume in a period of time, for example during the time from 11 am to 1 pm on Jun. 12, 2014, may be determined or calculated as an average number of concurrent calls over the whole hour. For example, if 50 calls were continuously active from 11 am to noon and 30 calls were continuously active from noon to 1 pm, the average call loading would be 40 calls. In general, the pattern of calls would be more complicated than this simple example, but the method is readily extrapolated by one of skill in the art to other call scenarios. As another example, the average of traffic on a few peak days of the year may be calculated and used as the average peak traffic. The average peak traffic of a cell tower may be used to compare with a maximum traffic threshold of a category with which the cell tower belongs. Traffic loads and average traffic loads could be calculated in other ways. Traffic loads could be calculated over 15 minute intervals, 10 minute intervals, 5 minute intervals or some other time interval.

Similarly, the application 104 may augment capacity of a category three cell tower when the average peak traffic of the cell tower reaches a fifth predefined threshold. The fifth predefined threshold may be larger than the second predefined threshold. The application 104 may limit a drop rate of category three cell towers to a sixth predefined threshold. The sixth predefined threshold may be larger than a fourth predefined threshold. In an embodiment, the application 104 may augment capacity of a cell tower by sending a notification on capacity augmentation to relevant personnel. Alternatively, capacity augmentation may be automated in this situation, for example by sending a notification on capacity augmentation to an application or a server computer that manages the cell tower to activate more available capacity of the cell tower. The application 104 may limit a drop rate of a cell tower by sending a notification on limiting the drop rate to relevant personnel.

The application 104 may limit a drop rate of category one cell towers to a third predefined threshold. A drop rate may be a fraction of cut-off voice or data calls over all voice or data calls. A voice or data call may be considered to be cut off when the voice or data call is dropped, due to technical reasons, before the voice or data call is terminated by parties involved in the voice or data call. For example, the application 104 may limit the drop rate of category one cell towers to 2%. The application 104 may limit a drop rate of category two cell towers to the fourth predefined threshold. For example, the application 104 may limit the drop rate of category two cell towers to 5%. The fourth predefined threshold may be larger than the third predefined threshold. For example, the drop rate for category two cell towers may be larger than the drop rate for category one cell towers.

Figure 2:
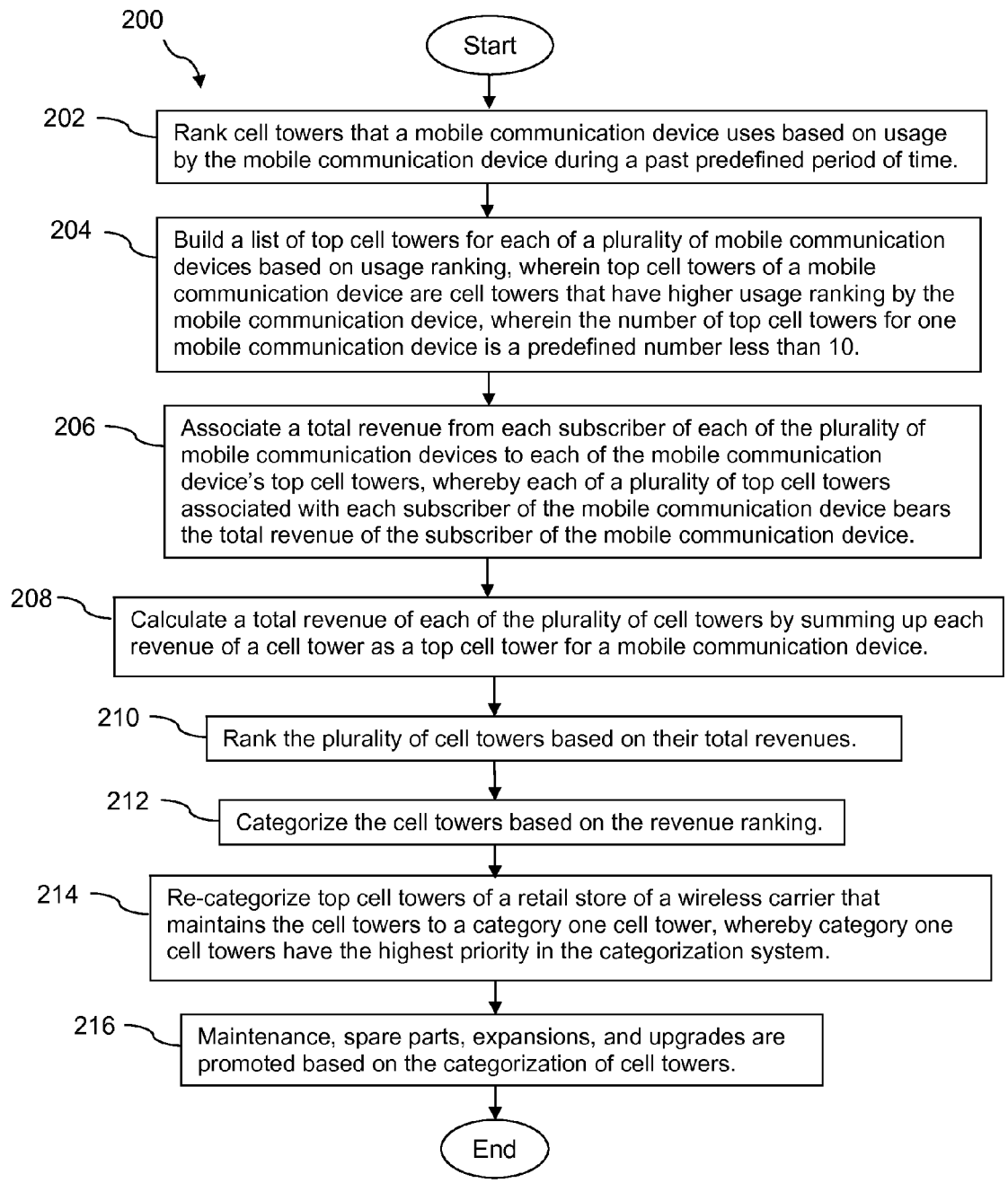
FIG. 2 is a flow chart illustrating a method according to an embodiment of the disclosure.

Turning now to FIG. 2, a method 200 is described. At block 202, cell towers that a mobile communication device uses are ranked based on usage by the mobile communication device during a past predefined period of time. For example, cell towers 116 that a mobile communication device 114 uses may be ranked by the application 104 based on usage of the subject cell towers by the mobile communication device 114 during a past predefined period of time.

At block 204, a list of top cell towers is built for each of a plurality of mobile communication devices 114 based on usage ranking, wherein top cell towers of a mobile communication device 114 are cell towers that have higher usage ranking by the mobile communication device 114, wherein the number of top cell towers for one mobile communication device 114 is a predefined number less than 10. At block 206, a total revenue from each subscriber of each of the plurality of mobile communication devices 114 is associated to each of the mobile communication device's top cell towers, whereby each of a plurality of top cell towers associated with each subscriber of the mobile communication device bears the total revenue of the subscriber of the mobile communication device 114. At block 208, a total revenue of each of the plurality of cell towers is calculated by summing up each revenue of a cell tower as a top cell tower for a mobile communication device. For example, a total revenue of each of the cell towers 116 may be calculated by the application 104 by summing up each revenue of a cell tower 116 as a top cell tower for a mobile communication device 114.

At block 210, the plurality of cell towers 116 are ranked based on their total revenues. At block 212, the cell towers 116 are categorized based on the revenue ranking. At block 214, top cell towers of a retail store of a wireless carrier that maintains the cell towers are re-categorized to a category one cell tower, whereby category one cell towers have the highest priority in the categorization system. For example, those cell towers that were initially categorized during the analysis of block 210 and 212 as category 2, category 3, or category 4 are re-categorized as a category one cell tower by virtue of the cell tower being associated with or serving the proximity of a retail store of the wireless carrier. It is understood that the re-categorization described for block 214 is different from a change of cell tower categorization that might occur when the method 200 is reiterated beginning with block 202, for example when the method 200 is periodically reiterated to refresh the categorization of cell towers based on new usage data or new revenue data, for example monthly, quarterly, yearly, or on some other periodic interval.

At block 216, maintenance, spare parts, expansions, and upgrades are promoted based on the categorization of cell towers 116. For example, limited budgets and resources for maintaining and upgrading cell towers are allocated to cell towers based on the categorization of cell towers 116. Generally, more budget and/or resources are allocated to maintaining and/or upgrading category one cell towers than to category two towers; more budget and/or resources are allocated to maintaining and/or upgrading category two cell towers than to category three towers; and more budget and/or resources are allocated to maintaining and/or upgrading category three cell towers than to category four cell towers. In an embodiment, no distinction may be made between the allocation of budget and resources to category three cell towers versus category four cell towers. In an embodiment, cell towers may be categorized only into category one cell towers, category two cell towers, and category three cell towers.

Figure 3A:
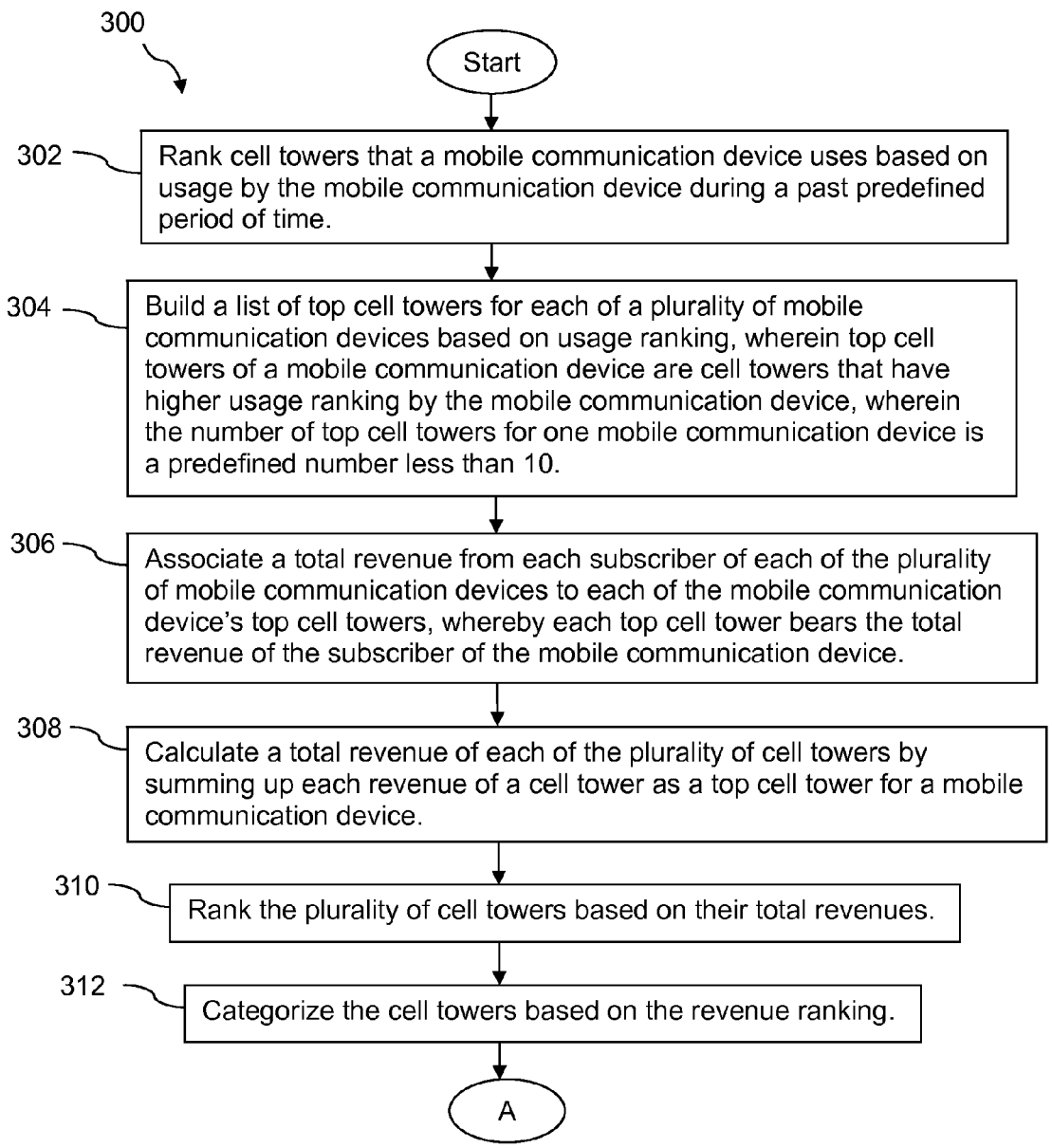
FIG. 3A and FIG. 3B is a flow chart illustrating another method according to an embodiment of the disclosure.
Figure 3B:
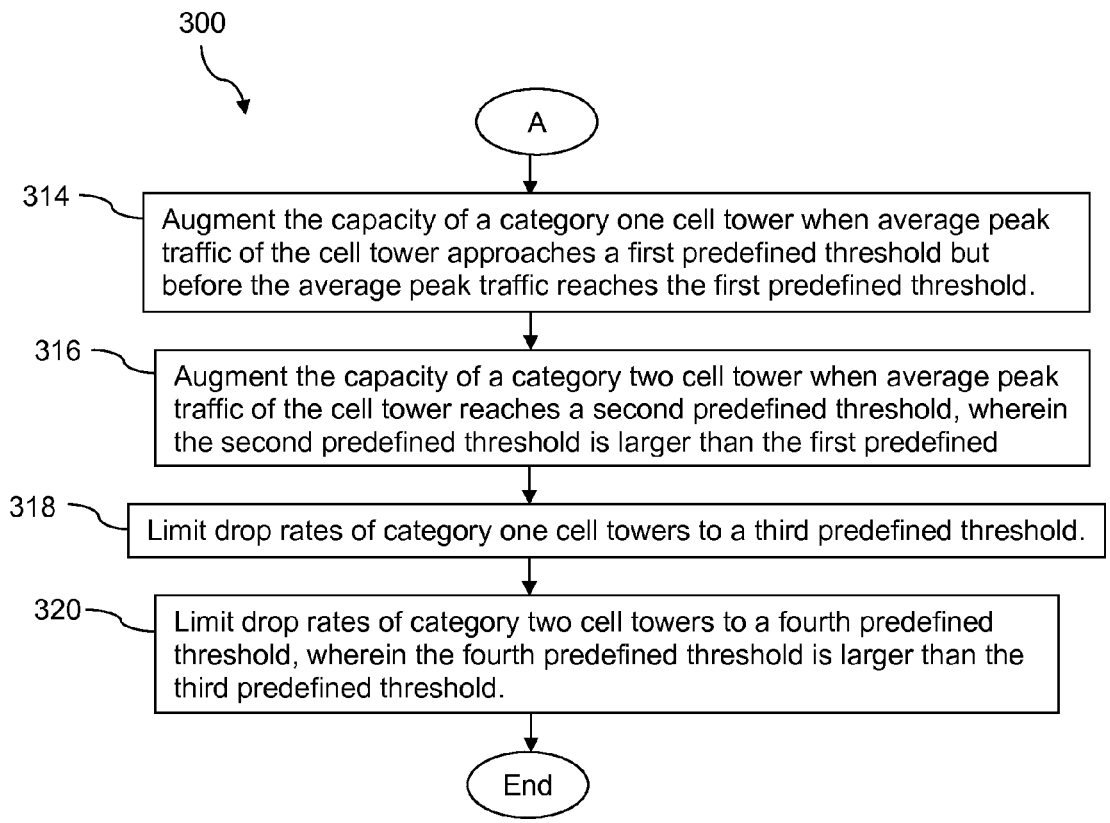

Turning now to FIG. 3A and FIG. 3B, a method 300 is described. At block 302, cell towers 116 that a mobile communication device 114 uses are ranked based on usage by the mobile communication device 114 during a past predefined period of time. At block 304, a list of top cell towers 116 is built for each of a plurality of mobile communication devices 114 based on usage ranking, wherein top cell towers of a mobile communication device 114 are cell towers that have higher usage ranking by the mobile communication device 114, wherein the number of top cell towers for one mobile communication device 114 is a predefined number less than 10.

At block 306, a total revenue from each subscriber of each of the plurality of mobile communication devices 114 is associated to each of the mobile communication device's top cell towers, whereby each top cell tower bears the total revenue of the subscriber of the mobile communication device 114. At block 308, a total revenue of each of the plurality of cell towers is calculated by summing up each revenue of a cell tower as a top cell tower for a mobile communication device 114.

At block 310, the plurality of cell towers 116 are ranked based on their total revenues. At block 312, the cell towers 116 are categorized based on the revenue ranking. At block 314, the capacity of a category one cell tower is augmented when average peak traffic of the cell tower approaches a first predefined threshold but before the average peak traffic reaches the first predefined threshold. The average peak traffic may be calculated in a variety of ways. For example, average traffic during peak hours in a peak month of a year may be calculated as the average peak traffic. For example, noon of Mother's day is well known as the busiest hour in a whole year for voice calls. Thus, traffic from 11 am to 1 pm may be collected from May 11 to June 11 and average peak traffic may be calculated based on that. As another example, the average of traffic on a few peak days of the year may be calculated and used as the average peak traffic. The average peak traffic of a cell tower may be used to compare with a maximum traffic threshold of a category with which the cell tower belongs.

At block 316, the capacity of a category two cell tower is augmented when average peak traffic of the cell tower reaches a second predefined threshold, wherein the second predefined threshold is larger than the first predefined threshold. At block 318, drop rates of category one cell towers are limited to a third predefined threshold. At block 320, drop rates of category two cell towers are limited to a fourth predefined threshold, wherein the fourth predefined threshold is larger than the third predefined threshold.

Figure 4A:
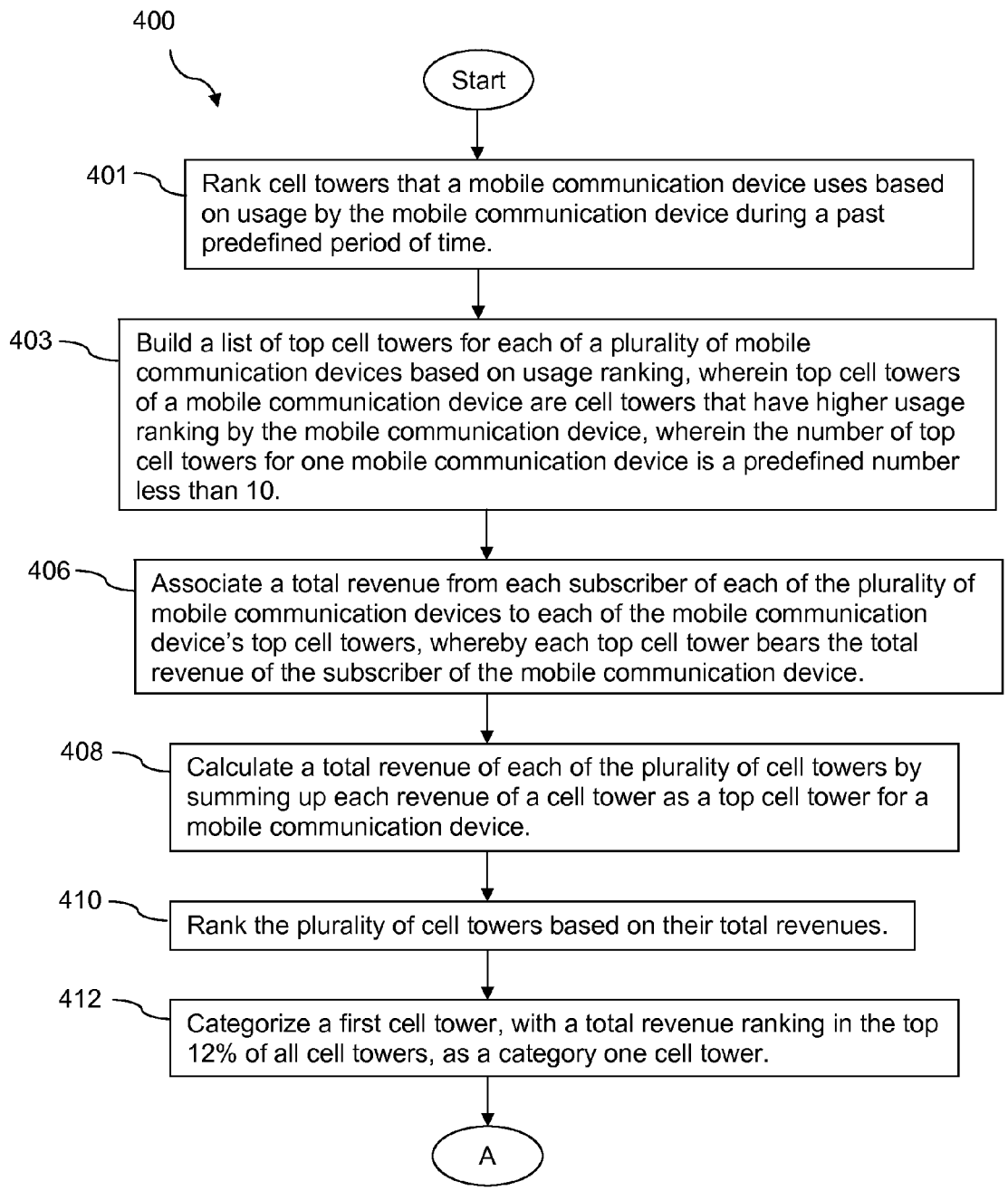
FIG. 4A and FIG. 4B is a flow chart illustrating a third method according to an embodiment of the disclosure.
Figure 4B:
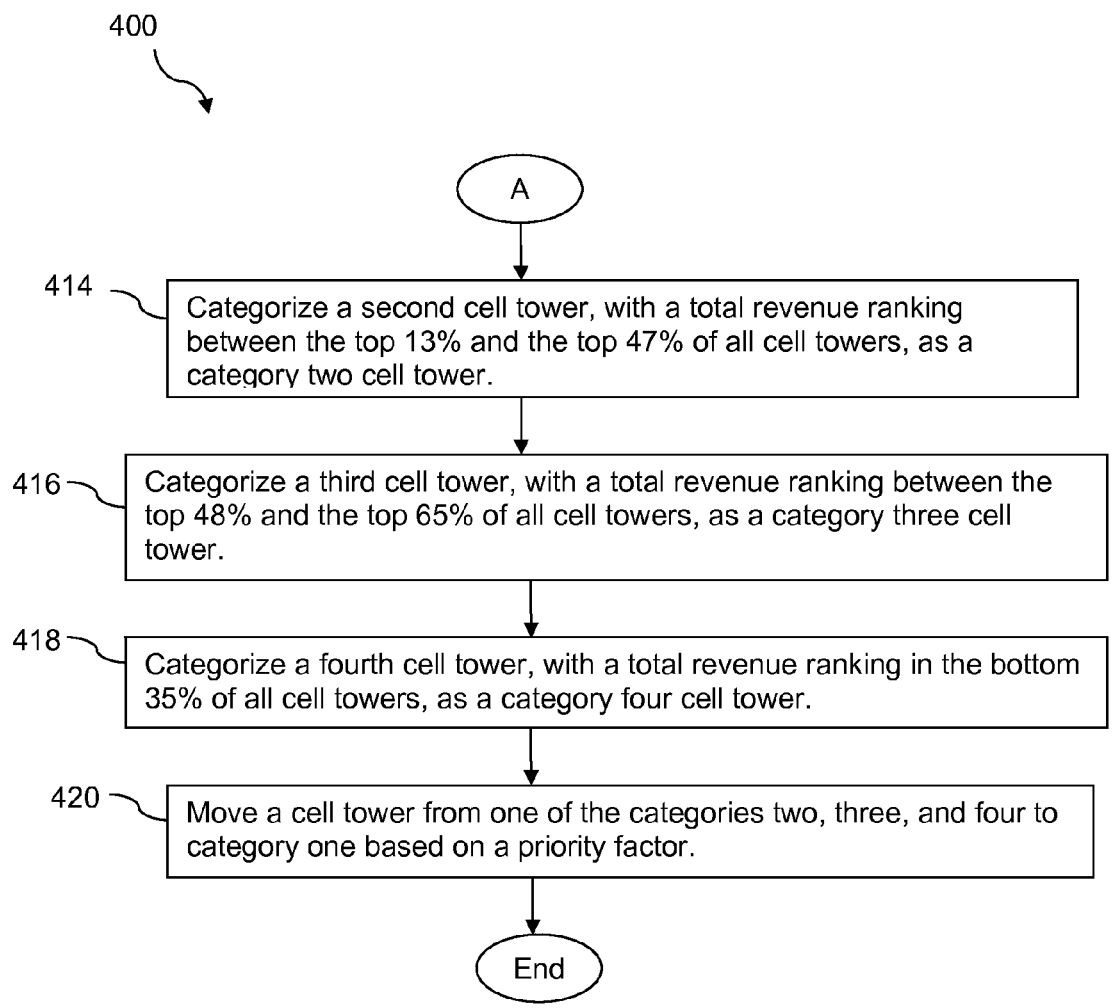

Turning now to FIG. 4A and FIG. 4B, a method 400 is described. At block 401, cell towers 116 that a mobile communication device 114 uses are ranked based on usage by the mobile communication device 114 during a past predefined period of time.

At block 403, a list of top cell towers is built for each of a plurality of mobile communication devices 114 based on usage ranking, wherein top cell towers of a mobile communication device 114 are cell towers that have higher usage ranking by the mobile communication device 114, wherein the number of top cell towers for one mobile communication device 114 is a predefined number less than 10.

At block 406, a total revenue from each subscriber of each of the plurality of mobile communication devices 114 is associated to each of the mobile communication device's top cell towers, whereby each top cell tower bears the total revenue of the subscriber of the mobile communication device 114. At block 408, a total revenue of each of the plurality of cell towers is calculated by summing up each revenue of a cell tower as a top cell tower for a mobile communication device 114.

At block 410, the plurality of cell towers 116 are ranked based on their total revenues. At block 412, a first cell tower 116, with a total revenue ranking in the top 12% of all cell towers 116, is categorized as a category one cell tower. At block 414, a second cell tower 116, with a total revenue ranking between the top 13% and the top 47% of all cell towers 116, is categorized as a category two cell tower.

At block 416, a third cell tower 116, with a total revenue ranking between the top 48% and the top 65% of all cell towers 116, is categorized as a category three cell tower. At block 418, a fourth cell tower 116, with a total revenue ranking in the bottom 35% of all cell towers 116, is categorized as a category four cell tower. At block 420, a cell tower 116 is moved from one of the categories two, three, and four to category one based on a priority factor.

Figure 5:
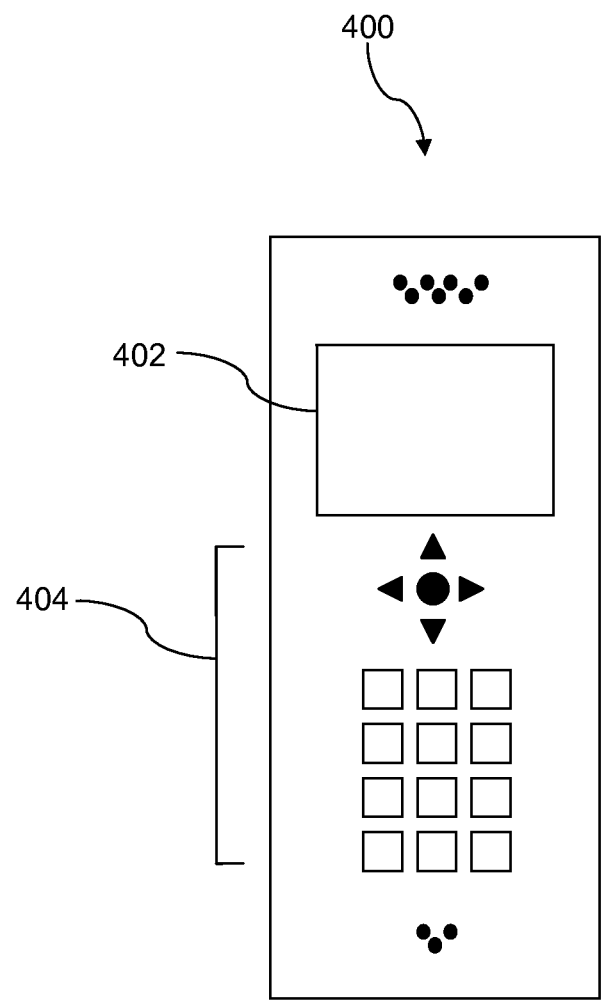
FIG. 5 is an illustration of a mobile communication device according to an embodiment of the disclosure.

FIG. 5 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 6:
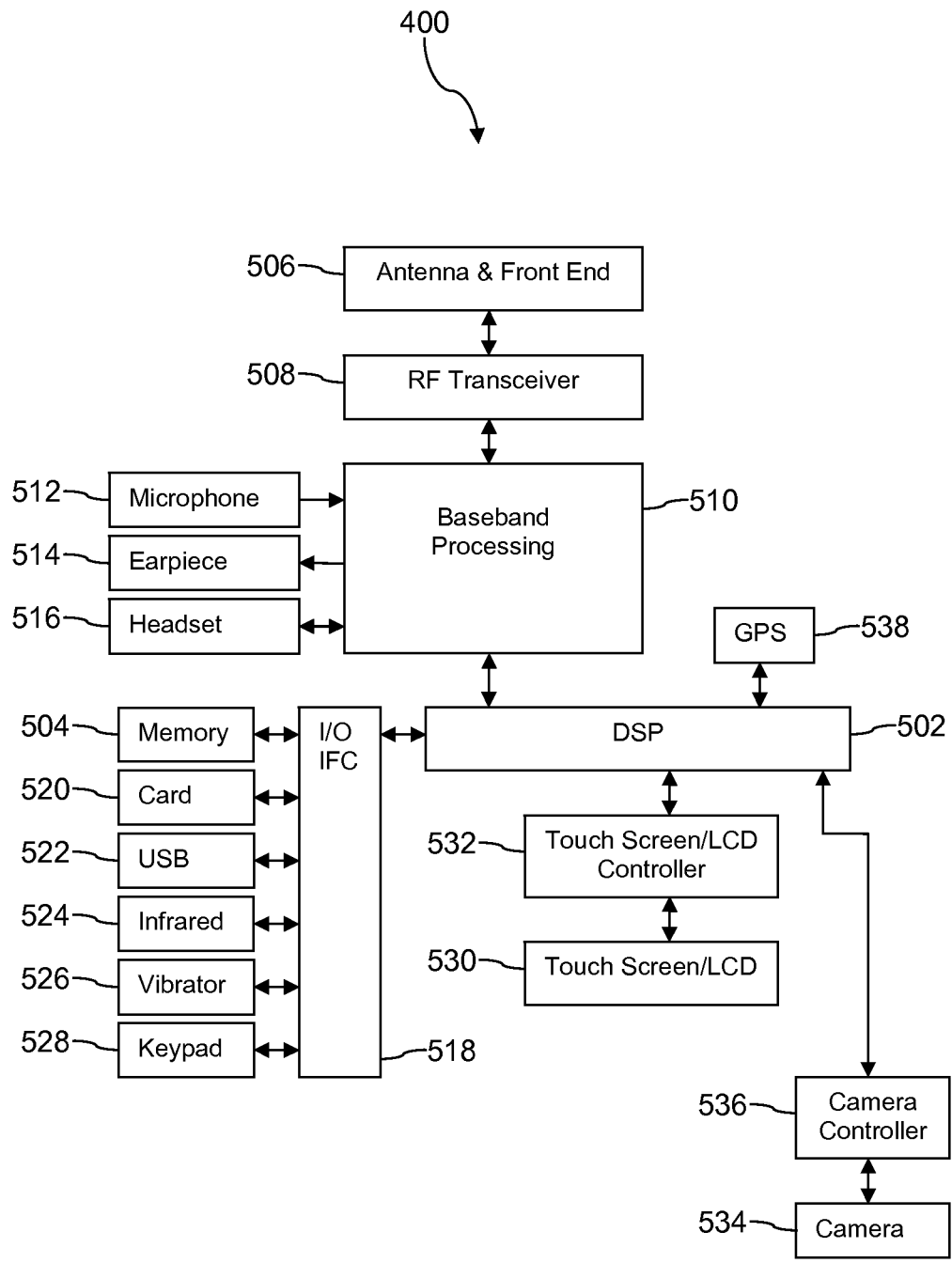
FIG. 6 is a block diagram of a mobile communication device according to an embodiment of the disclosure.

FIG. 6 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
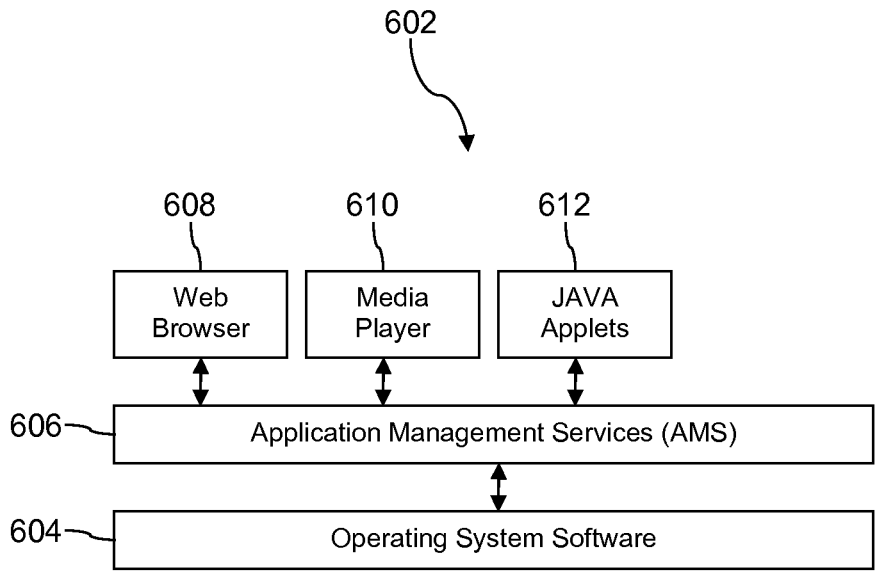
FIG. 7A is a block diagram of a software architecture of a mobile communication device according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
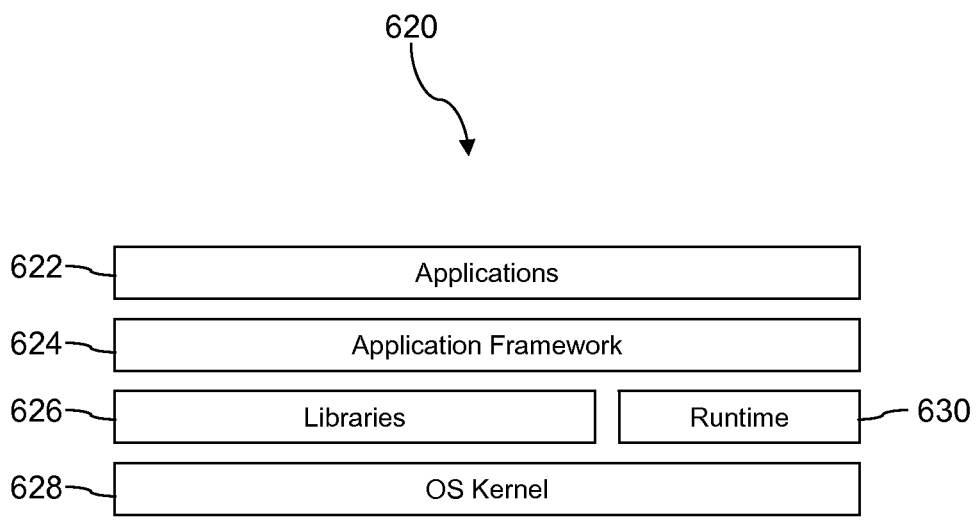
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
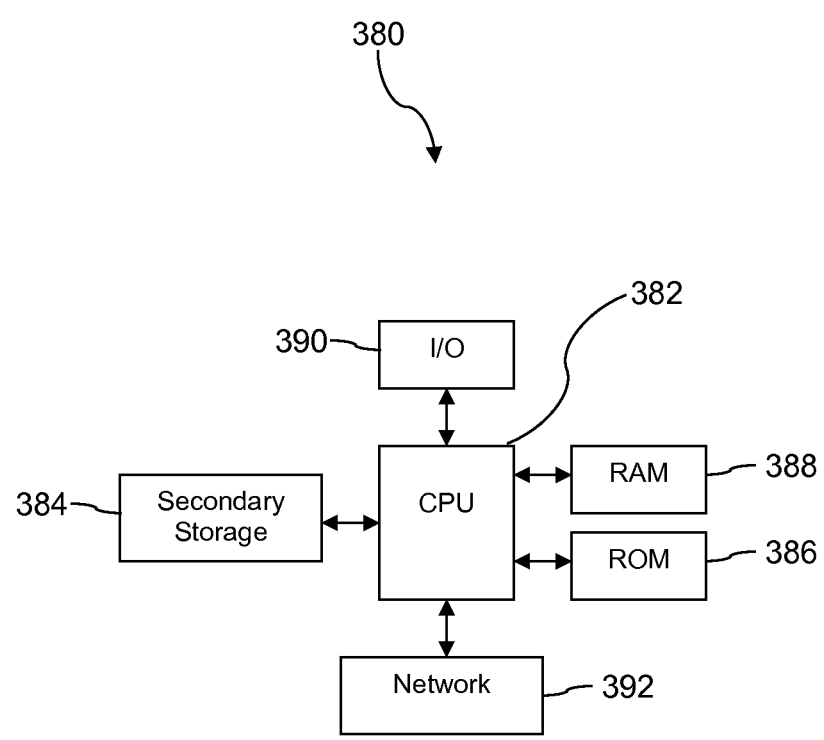
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of prioritizing network efforts using customer impact performed by a server computer in a wireless communications service provider network, comprising:

accessing call detail records regarding voice and data call activities of a plurality of mobile communication devices;

for each mobile communication device of the plurality of mobile communication devices, ranking cell towers that the mobile communication device uses based on the call detail records for the mobile communication device;

building a list of top cell towers for each mobile communication device of the plurality of mobile communication devices based on the usage ranking, wherein top cell towers of each mobile communication device are cell towers that have higher usage ranking by the mobile communication device, and wherein the number of top cell towers for one mobile communication device is a predefined number less than 10;

associating a total revenue from each subscriber of each mobile communication device of the plurality of mobile communication devices to each of the mobile communication device's top cell towers, wherein each of the top cell towers for the mobile communication device bears the total revenue of the subscriber of the mobile communication device;

calculating a total revenue of each cell tower of a plurality of cell towers by summing up each revenue of the cell tower as a top cell tower for one of the plurality of mobile communication devices;

ranking the plurality of cell towers based on their total revenues;

categorizing each of the cell towers based on the revenue ranking into one of a plurality of categories, wherein the plurality of categories comprises category one cell towers, and wherein the category one cell towers have the highest priority;

re-categorizing top cell towers of a retail store of a wireless carrier that maintains the plurality of cell towers to the category one cell towers; and responsive to an average peak traffic of a category one cell tower approaching a category one predefined peak traffic threshold, augmenting, by the server computer in the wireless communications service provider network, available capacity of the category one cell tower before the average peak traffic of the category one cell tower reaches the category one predefined peak traffic threshold.

2. The method of claim 1, wherein a full scale cell tower serving custom network solutions is re-categorized to a category one cell tower.

3. The method of claim 1, wherein a cell tower that supports wireless communications of a first responder is re-categorized to a category one cell tower.

4. The method of claim 1, wherein a cell tower can be prioritized but not deprioritized in each of a plurality of cell tower categorization cycles.

5. The method of claim 1, wherein spare parts for the category one cell towers are stored so that the spare parts can be easily accessed within a short period of time.

6. The method of claim 1, wherein the categorization of cell towers is updated periodically.

7. A method of prioritizing wireless network efforts using customer impact performed by a server computer in a wireless communications service provider network, comprising:

accessing call detail records regarding voice and data call activities of a plurality of mobile communication devices;

for each mobile communication device of the plurality of mobile communication devices, ranking cell towers that the mobile communication device uses based on the call detail records for the mobile communication device;

building a list of top cell towers for each mobile communication device of the plurality of mobile communication devices based on the usage ranking, wherein top cell towers of each mobile communication device are cell towers that have higher usage ranking by the mobile communication device, and wherein the number of top cell towers for one mobile communication device is a predefined number less than 10;

associating a total revenue from each subscriber of each mobile communication device of the plurality of mobile communication devices to each of the mobile communication device's top cell towers, wherein each of the top cell towers for the mobile communication device bears the total revenue of the subscriber of the mobile communication device;

calculating a total revenue of each cell tower of a plurality of cell towers by summing up each revenue of the cell tower as a top cell tower for one of the plurality of mobile communication devices;

ranking the plurality of cell towers based on their total revenues;

categorizing each of the cell towers based on the revenue ranking into one of a plurality of categories, wherein the plurality of categories comprises category one cell towers and category two cell towers, and wherein the category one cell towers have the highest priority;

responsive to an average peak traffic of a category one cell tower approaching a category one predefined peak traffic threshold, augmenting, by the server computer in the wireless communications service provider network, available capacity of the category one cell tower before the average peak traffic of the category one cell tower reaches the category one predefined peak traffic threshold;

augmenting, by the server computer in the wireless communications service provider network, available capacity of a category two cell tower when average peak traffic of the category two cell tower reaches a category two predefined peak traffic threshold, wherein the category two predefined peak traffic threshold is larger than the category one predefined peak traffic threshold;

limiting drop rates of category one cell towers to a category one predefined drop rate threshold; and limiting drop rates of category two cell towers to a category two predefined drop rate threshold, wherein the category two predefined drop rate threshold is larger than the category one predefined drop rate threshold.

8. The method of claim 7, wherein a cell tower can be prioritized but not deprioritized in each of a plurality of cell tower categorization cycles.

9. The method of claim 7, wherein the categorization of cell towers is used for planning build-outs.

10. The method of claim 7, further comprising, augmenting available capacity of a category three cell tower when average peak traffic of the category three cell tower reaches a category three predefined peak traffic threshold, wherein the category three predefined peak traffic threshold is larger than the category two predefined peak traffic threshold.

11. The method of claim 7, further comprising, limiting a drop rate of category three cell towers to a category three predefined drop rate threshold, wherein the category three predefined drop rate threshold is larger than the category two predefined drop rate threshold.

12. The method of claim 7, wherein each of the plurality of mobile communication devices is one of a mobile phone, a personal digital assistant (PDA), a media player, a laptop computer, a tablet computer, a notebook computer, a wearable computer, or a headset computer.

13. The method of claim 7, wherein each of the plurality of mobile communication devices establishes a wireless communication with a radio access network according to a code division multiple access (CDMA) wireless communication protocol, a global system for mobile communication (GSM) wireless communication protocol, a long-term evolution (LTE) wireless communication protocol, or a worldwide interoperability for microwave access (WiMAX) wireless communication protocol.

14. A method of categorizing cell towers in a mobile communication network performed by a server computer in a wireless communications service provider network, comprising:

accessing call detail records regarding voice and data call activities of a plurality of mobile communication devices;

for each mobile communication device of the plurality of mobile communication devices, ranking cell towers that the mobile communication device uses based on the call detail records for the mobile communication device;

building a list of top cell towers for each mobile communication device of the plurality of mobile communication devices based on the usage ranking, wherein top cell towers of each mobile communication device are cell towers that have higher usage ranking by the mobile communication device, and wherein the number of top cell towers for one mobile communication device is a predefined number less than 10;

associating a total revenue from each subscriber of each mobile communication device of the plurality of mobile communication devices to each of the mobile communication device's top cell towers, wherein each the top cell towers for the mobile communication device bears the total revenue of the subscriber of the mobile communication device;

calculating a total revenue of each cell tower of a plurality of cell towers by summing up each revenue of the cell tower as a top cell tower for one of the plurality of mobile communication devices;

ranking the plurality of cell towers based on their total revenues;

categorizing a first cell tower, with a total revenue ranking in the top 12% of all cell towers, as a category one cell tower;

categorizing a second cell tower, with a total revenue ranking between the top 13% and the top 47% of all cell towers, as a category two cell tower;

categorizing a third cell tower, with a total revenue ranking between the top 48% and the top 65% of all cell towers, as a category three cell tower;

categorizing a fourth cell tower, with a total revenue ranking in the bottom 35% of all cell towers, as a category four cell tower;

re-categorizing a cell tower from category two, category three, or category four to category one based on a priority factor; and responsive to an average peak traffic of a category one cell tower approaching a category one predefined peak traffic threshold, augmenting, by the server computer in the wireless communications service provider network, available capacity of the category one cell tower before the average peak traffic of the category one cell tower reaches the category one predefined peak traffic threshold.

15. The method of claim 14, wherein the priority factor comprises serving a first responder.

16. The method of claim 14, wherein the priority factor comprises serving a custom network solutions location.

17. The method of claim 14, wherein the priority factor comprises serving a wireless communication device retail store.

18. The method of claim 14, further comprising, augmenting available capacity of a category two cell tower when average peak traffic of the category two cell tower reaches a category two predefined peak traffic threshold, wherein the category two predefined peak traffic threshold is larger than the category one predefined peak traffic threshold.

19. The method of claim 1, wherein the application augments the available capacity of the category one cell tower by sending a notification to a server computer that manages the category one cell tower to activate more available capacity of the category one cell tower.

20. The method of claim 1, further comprising, augmenting available capacity of a category two cell tower when average peak traffic of the category two cell tower reaches a category two predefined peak traffic threshold, wherein the category two predefined peak traffic threshold is larger than the category one predefined peak traffic threshold.

* * * * *